US012715432B2

(12) United States Patent
Shimizu et al.

(10) Patent No.: US 12,715,432 B2
(45) Date of Patent: Aug. 25, 2026

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Takahiro Shimizu, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 19/059,734

(22) Filed: Feb. 21, 2025

(65) Prior Publication Data

US 2025/0304054 A1 Oct. 2, 2025

(30) Foreign Application Priority Data

Mar. 27, 2024 (JP) ................................ 2024-050734

(51) Int. Cl.
*B60W 30/095* (2012.01)
*B60W 30/12* (2020.01)
(Continued)

(52) U.S. Cl.
CPC ........ *B60W 30/0956* (2013.01); *B60W 30/12* (2013.01); *G06T 7/13* (2017.01);
(Continued)

(58) Field of Classification Search
CPC ............. B60W 30/0956; B60W 30/12; B60W 2552/53; B60W 2554/00; G06T 7/13;
(Continued)

(56) References Cited

U.S. PATENT DOCUMENTS 11,845,435 B2 * 12/2023 Yatagai ........... B60W 30/18159
2007/0225913 A1 * 9/2007 Ikeda ........................ G06T 7/60
382/104

(Continued)

FOREIGN PATENT DOCUMENTS

JP 2001-023094 1/2001
JP 2008-049918 3/2008

(Continued)

OTHER PUBLICATIONS

Japanese Notice Of Allowance for Japanese Patent Application No. 2024-050734 m ailed Sep. 24, 2025.

*Primary Examiner* — Michael C Zarroli
(74) *Attorney, Agent, or Firm* — Amin, Turocy & Watson, LLP

(57) ABSTRACT

A mobile object control device includes: a moving controller configured to perform moving control of a mobile object on the basis of a first marking line and a second marking line, which is recognized from a detection device or map information. The moving controller performs at least one of limitation of the moving control and notification associated with the limitation when the moving speed when moving the marking line so as to align the position of the first marking line or the second marking line is equal to or higher than a predetermined speed and an obstacle is present in an extending direction of the first marking line. The moving controller continues to perform the moving control when it is determined that the moving speed is equal to or greater than the predetermined speed and an obstacle is not present in the extending direction of the first marking line.

8 Claims, 9 Drawing Sheets

(51) Int. Cl.

| | |
|---|---|
| ***G06T 7/13*** | (2017.01) |
| ***G06T 7/20*** | (2017.01) |
| ***G06V 20/56*** | (2022.01) |
| ***G06V 20/58*** | (2022.01) |

(52) U.S. Cl.
CPC ................ *G06T 7/20* (2013.01); *G06V 20/58* (2022.01); *G06V 20/588* (2022.01); *G06V 2201/07* (2022.01)

(58) Field of Classification Search
CPC ........ G06T 7/20; G06V 20/58; G06V 20/588; G06V 2201/07; G05D 1/43; G05D 1/242
See application file for complete search history.

(56) References Cited

U.S. PATENT DOCUMENTS

| | | | | |
|---|---|---|---|---|
| 2018/0208201 | A1 | 7/2018 | Hui et al. | |
| 2019/0130742 | A1 | 5/2019 | Tokunaga et al. | |
| 2021/0224557 | A1 | 7/2021 | Miyagawa | |
| 2022/0306116 | A1* | 9/2022 | Hashimoto | B60W 60/0053 |

FOREIGN PATENT DOCUMENTS

| | | |
|---|---|---|
| JP | 2016-148893 | 8/2016 |
| WO | 2017/187883 | 11/2017 |
| WO | 2020/058735 | 3/2020 |

* cited by examiner

FIG. 9

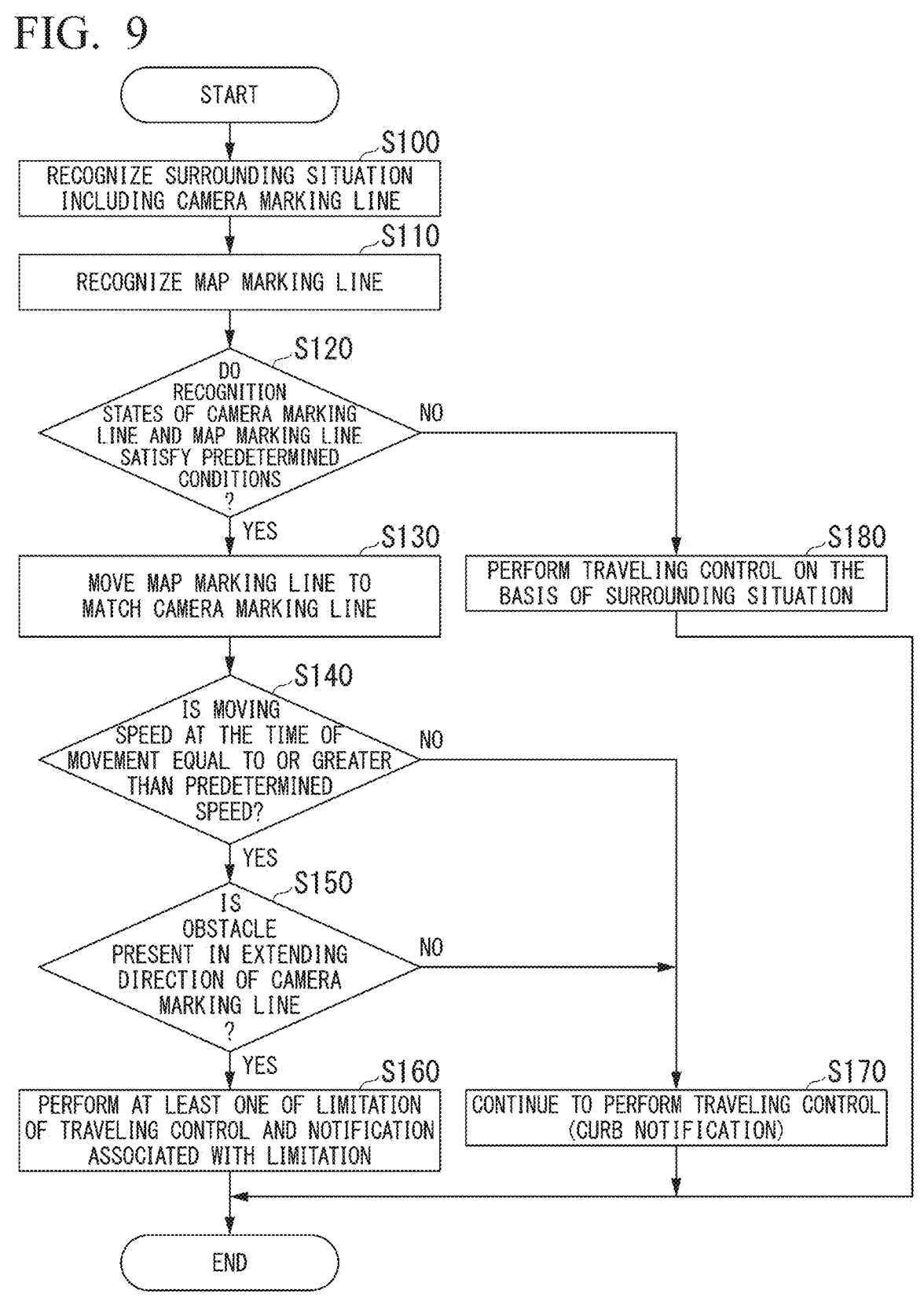

START

S100 RECOGNIZE SURROUNDING SITUATION INCLUDING CAMERA MARKING LINE

S110 RECOGNIZE MAP MARKING LINE

S120 DO RECOGNITION STATES OF CAMERA MARKING LINE AND MAP MARKING LINE SATISFY PREDETERMINED CONDITIONS ?

YES

NO

S130 MOVE MAP MARKING LINE TO MATCH CAMERA MARKING LINE

S180 PERFORM TRAVELING CONTROL ON THE BASIS OF SURROUNDING SITUATION

S140 IS MOVING SPEED AT THE TIME OF MOVEMENT EQUAL TO OR GREATER THAN PREDETERMINED SPEED?

YES

NO

S150 IS OBSTACLE PRESENT IN EXTENDING DIRECTION OF CAMERA MARKING LINE ?

YES

NO

S160 PERFORM AT LEAST ONE OF LIMITATION OF TRAVELING CONTROL AND NOTIFICATION ASSOCIATED WITH LIMITATION

S170 CONTINUE TO PERFORM TRAVELING CONTROL (CURB NOTIFICATION)

END

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2024-050734, filed Mar. 27, 2024, the content of which is incorporated herein by reference.

BACKGROUND

Field of the Invention

The present invention relates to a mobile object control device, a mobile object control method, and a storage medium.

Description of Related Art

Recently, countermeasures for providing access to a sustainable transportation system in which vulnerable persons out of traffic participants are considered have been actively studied. In order to realize such countermeasures, focus has been concentrated on research and development for further improving safety or convenience of traffic through research and development on automated driving technology. In this regard, a technique of estimating a position of one white line using a lane width estimated from a host vehicle and a nearby vehicle when only the other of left and right white lines of the host vehicle has been detected and a technique of stopping lane-keeping traveling when a white line cannot be detected have been recently disclosed (for example, Japanese Unexamined Patent Application, First Publication No. 2016-148893 and Japanese Unexamined Patent Application, First Publication No. 2001-023094).

SUMMARY

In such automated driving technology according to the related art, it cannot be said that limiting or maintaining moving control of a mobile object using only information of one marking line has been sufficiently studied, and there is room for further study thereof.

In order to solve the aforementioned problem, an objective of the present invention is to provide a mobile object control device, a mobile object control method, and a storage medium that can perform more appropriate moving control according to a surrounding situation of a mobile object. Another objective thereof is to contribute to advancement of a sustainable transportation system.

A mobile object control device, a mobile object control method, and a storage medium according to the present invention employ the following configurations.

(1) According to an aspect of the present invention, there is provided a mobile object control device including: a first recognizer configured to recognize a first marking line defining a moving lane in which a mobile object is moving and a surrounding situation including an obstacle near the mobile object on the basis of an output of a detection device detecting the surrounding situation of the mobile object; a second recognizer configured to recognize a second marking line defining a moving lane near the mobile object from map information on the basis of position information of the mobile object; a moving controller configured to perform moving control of the mobile object on the basis of at least one of the first marking line and the second marking line; an adjuster configured to move and adjust a position of the first marking line or the second marking line such that the positions of the first marking line and the second marking line with respect to a position of the mobile object match when recognition states of the first marking line and the second marking line defining the moving lane in which the mobile object is present satisfy predetermined conditions; and a speed determiner configured to determine whether a moving speed when the first marking line or the second marking line is moved by the adjuster is equal to or greater than a predetermined speed, wherein the moving controller performs at least one of limitation of the moving control and notification associated with the limitation when the speed determiner determines that the moving speed is equal to or greater than the predetermined speed and an obstacle is present in an extending direction of the first marking line, and the moving controller continues to perform the moving control when it is determined that the moving speed is equal to or greater than the predetermined speed and an obstacle is not present in the extending direction of the first marking line.

(2) In the aspect of (1), when the first marking line and the second marking line are recognized on one side of left and right marking lines defining the moving lane when seen from the mobile object and only the second marking line is recognized on the other side, the adjuster moves the position of the second marking line such that an angle formed by the extending directions of the first marking line and the second marking line on the one side is less than a predetermined angle.

(3) In the aspect of (2), adjustment performed by the adjuster is to rotate the second marking line, and the moving speed is a rotational speed based on the rotation of the second marking line.

(4) In the aspect of (3), the moving speed is an estimated angular velocity of the position of the mobile object which is estimated on the basis of the rotation of the second marking line, and the speed determiner determines that the moving speed is equal to or greater than the predetermined speed when a degree of separation between the estimated angular velocity and a measured angular velocity measured by a sensor measuring an angular velocity of the mobile object is equal to or greater than a threshold value.

(5) In the aspect of (2), the obstacle includes another mobile object near the mobile object, and the moving controller performs at least one of limitation of the moving control and notification associated with the limitation when a future position of the other mobile object is present in the extending direction of the first marking line on the one side.

(6) In the aspect of (1), the moving controller continues to perform the moving control regardless of whether an obstacle is present when the moving speed is less than the predetermined speed.

(7) According to another aspect of the present invention, there is provided a mobile object control method that is performed by a computer, the mobile object control method including: recognizing a first marking line defining a moving lane in which a mobile object is moving and a surrounding situation including an obstacle near the mobile object on the basis of an output of a detection device detecting the surrounding situation of the mobile object; recognizing a second marking line defining a moving lane near the mobile object from map information on the basis of position information of the mobile object; performing moving control of the mobile object on the basis of at least one of the first marking line and the second marking line; moving and adjusting a position of the first marking line or the second marking line such that the positions of the first marking line and the second marking line with respect to a position of the mobile object match when recognition states of the first marking line and the second marking line defining the moving lane in which the mobile object is present satisfy predetermined conditions; determining whether a moving speed when the first marking line or the second marking line is moved is equal to or greater than a predetermined speed; performing at least one of limitation of the moving control and notification associated with the limitation when it is determined that the moving speed is equal to or greater than the predetermined speed and an obstacle is present in an extending direction of the first marking line; and continuing to perform the moving control when it is determined that the moving speed is equal to or greater than the predetermined speed and an obstacle is not present in the extending direction of the first marking line.

(8) According to another aspect of the present invention, there is provided a non-transitory computer-readable storage medium storing a program, the program causing a computer to perform: recognizing a first marking line defining a moving lane in which a mobile object is moving and a surrounding situation including an obstacle near the mobile object on the basis of an output of a detection device detecting the surrounding situation of the mobile object; recognizing a second marking line defining a moving lane near the mobile object from map information on the basis of position information of the mobile object; performing moving control of the mobile object on the basis of at least one of the first marking line and the second marking line; moving and adjusting a position of the first marking line or the second marking line such that the positions of the first marking line and the second marking line with respect to a position of the mobile object match when recognition states of the first marking line and the second marking line defining the moving lane in which the mobile object is present satisfy predetermined conditions; determining whether a moving speed when the first marking line or the second marking line is moved is equal to or greater than a predetermined speed; performing at least one of limitation of the moving control and notification associated with the limitation when it is determined that the moving speed is equal to or greater than the predetermined speed and an obstacle is present in an extending direction of the first marking line; and continuing to perform the moving control when it is determined that the moving speed is equal to or greater than the predetermined speed and an obstacle is not present in the extending direction of the first marking line.

According to the aspects of (1) to (8), it is possible to perform more appropriate moving control according to a surrounding situation of a mobile object.

BRIEF DESCRIPTION OF THE DRAWINGS

FIG. 9 is a flowchart illustrating an example of a flow of a driving control process according to the embodiment.

DESCRIPTION OF EMBODIMENTS

Hereinafter, a mobile object control device, a mobile object control method, and a storage medium according to an embodiment of the present invention will be described with reference to the accompanying drawings. In the following embodiment, it is assumed that a vehicle is used as an example of a mobile object and a mobile object control device is applied to an automated-driving vehicle. Automated driving is, for example, to perform driving control by automatically controlling one or both of steering and a speed of a vehicle. The driving control may include, for example, various types of driving control such as automated lane change (ALC), lane keeping assistance system (LKAS), adaptive cruise control system (ACC), traffic jam pilot (TJP), and collision mitigation brake system (CMBS). In an automated-driving vehicle, driving control (so-called manual driving) based on a manual operation of a user (for example, an occupant) of the vehicle may be performed. Examples of the mobile object may include a ship which can also move in a defined moving lane such as a hovercraft, a flying object which can travel on a road, and a standing vehicle including a power unit in addition to a vehicle.

[Entire Configuration]

Figure 1:
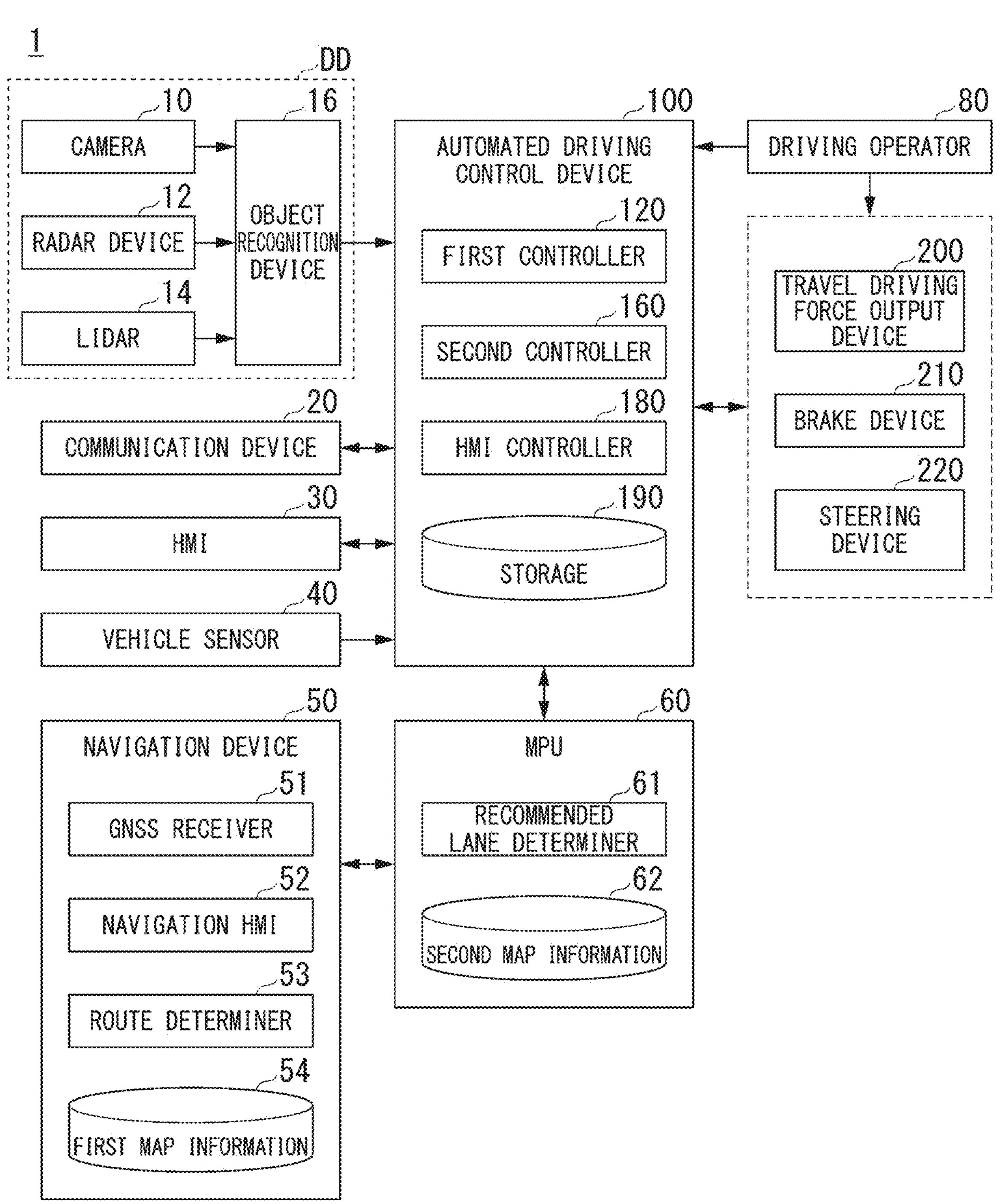
FIG. 1 is a diagram illustrating a configuration of a vehicle system including a mobile object control device according to an embodiment.

FIG. 1 is a diagram illustrating a configuration of a vehicle system 1 including a mobile object control device according to an embodiment. A vehicle (hereinafter referred to as a host vehicle M) in which the vehicle system 1 is mounted is, for example, a vehicle with two wheels, three wheels, or four wheels or a micromobility, and a drive source thereof is an internal combustion engine such as a diesel engine or a gasoline engine, an electric motor, or a combination thereof. The electric motor operates using electric power generated by a power generator connected to the internal combustion engine or using electric power discharged from a battery (a storage battery) such as a secondary battery or a fuel cell.

The vehicle system 1 includes, for example, a camera 10, a radar device 12, a Light Detection and Ranging (LIDAR) device 14, an object recognition device 16, a communication device 20, a human-machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example, and a part of the configuration may be omitted or another configuration may be added thereto. A combination of the camera 10, the radar device 12, the LIDAR device 14, and the object recognition device 16 is an example of a "detection device DD." The HMI 30 is an example of an "output device." The automated driving control device 100 is an example of a "mobile object control device."

The camera 10 is, for example, a digital camera using a solid-state imaging device such as a charge coupled device (CCD) or a complementary metal oxide semiconductor (CMOS). The camera 10 is attached to an arbitrary position on the host vehicle M in which the vehicle system 1 is mounted. When a forward view is imaged, the camera 10 is attached to an upper part of a front windshield, a rear surface of a rearview mirror, a front head part of a vehicle body, or the like. When a rearward view is imaged, the camera 10 is attached to an upper part of a rear windshield, a back door, or the like. When a side view is imaged, the camera 10 is attached to a door mirror or the like. The camera 10 images the surroundings of the host vehicle M, for example, periodically and repeatedly. The camera 10 may be a stereo camera.

The radar device 12 radiates radio waves such as millimeter waves to the surroundings of the host vehicle M, detects radio waves (reflected waves) reflected by a nearby object, and detects at least a position (a distance and a direction) of the object. The radar device 12 is attached to an arbitrary position on the host vehicle M. The radar device 12 may detect a position and a speed of an object using a frequency modulated continuous wave (FM-CW) method.

The LIDAR device 14 radiates light to the surroundings of the host vehicle M and measures scattered light. The LIDAR device 14 detects a distance to an object on the basis of a time from radiation of light to reception of light. The radiated light is, for example, a pulse-like laser beam. The LIDAR device 14 is attached to an arbitrary position on the host vehicle M.

The object recognition device 16 performs a sensor fusion process on results of detection from some or all of the camera 10, the radar device 12, and the LIDAR device 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR device 14 to the automated driving control device 100 without any change. In this case, the object recognition device 16 may be omitted from the configuration of the vehicle system 1 (the detection device DD).

The communication device 20 communicates with other vehicles near the host vehicle M, a terminal device of a user of the host vehicle M, or various server devices, for example, using a network such as a cellular network, a Wi-Fi network, Bluetooth (registered trademark), dedicated short range communication (DSRC), a local area network (LAN), a wide area network (WAN), or the Internet.

The HMI 30 presents various types of information to an occupant of the host vehicle M and receives an input operation from the occupant. The HMI 30 includes, for example, various types of display devices, a speaker, a buzzer, a touch panel, a switch, keys, and a microphone.

The vehicle sensor 40 includes a vehicle speed sensor that detects a speed of the host vehicle M, an acceleration sensor that detects acceleration, a yaw rate sensor that detects a yaw rate (for example, an angular velocity around a vertical axis passing through the center of gravity of the host vehicle M), and a direction sensor that detects a direction of the host vehicle M. The vehicle sensor 40 may include a position sensor that detects a position of the host vehicle M. The position sensor is an example of a "position measurer." The position sensor is, for example, a sensor that acquires position information (longitude and latitude information) from a global positioning system (GPS) device. The position sensor may be a sensor that acquires position information using a global navigation satellite system (GNSS) receiver 51 of the navigation device 50. The vehicle sensor 40 may derive the speed of the host vehicle M from a difference in position information (that is, a distance) at a predetermined time in the position sensor. The result detected by the vehicle sensor 40 is output to the automated driving control device 100.

The navigation device 50 includes, for example, a GNSS receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of signals received from GNSS satellites. The position of the host vehicle M may be identified or corrected by an inertial navigation system (INS) using the output of the vehicle sensor 40. The navigation HMI 52 includes a display device, a speaker, a touch panel, and keys. The GNSS receiver 51 may be provided in the vehicle sensor 40. The navigation HMI 52 may be partially or wholly shared by the HMI 30. For example, the route determiner 53 determines a route (hereinafter referred to as a route on a map) from the position of the host vehicle M identified by the GNSS receiver 51 (or an input arbitrary position) to a destination input by an occupant using the navigation HMI 52 with reference to the first map information 54. The first map information 54 is, for example, information in which a road shape is expressed by links indicating a road (an example of a moving lane) and nodes connected by the links. The first map information 54 may include point of interest (POI) information. The route on a map is output to the MPU 60. The navigation device 50 may perform route guidance using the navigation HMI 52 on the basis of the route on a map. The navigation device 50 may transmit a current position and a destination to a navigation server via the communication device 20 and acquire a route which is equivalent to the route on a map from the navigation server. The navigation device 50 outputs the determined route on a map to the MPU 60.

The MPU 60 includes, for example, a recommended lane determiner 61 and stores second map information 62 in a storage device such as an HDD or a flash memory. The recommended lane determiner 61 divides the route on a map provided from the navigation device 50 into a plurality of blocks (for example, blocks every 100 [m] in a vehicle traveling direction) and determines a recommended lane for each block with reference to the second map information 62. The recommended lane determiner 61 determines in which lane from the leftmost the host vehicle M is to travel. When there is a branching point in the route on a map, the recommended lane determiner 61 determines the recommended lane such that the host vehicle M can travel along a rational route for traveling to a branching destination.

The second map information 62 is map information with higher precision than the first map information 54. For example, the second map information 62 includes, for example, information of the number of lanes (the number of moving lanes), types or shapes of road marking lines (hereinafter referred to as marking lines), and lane centers or information road boundaries. The second map information 62 may include information indicating whether a road boundary is a boundary (a physical boundary) including a structure through which a vehicle cannot pass (cross or contact). Examples of the physical boundary include guardrails, curbstones, median strips, and fences. The structure through which a vehicle cannot pass may include a low step through which a vehicle can pass as long as vibration of the vehicle which will not normally occur is permitted. The second map information 62 may include road shape information, traffic regulation information, address information (addresses and postal codes), facility information, parking lot information, and phone number information. The road shape information may be replaced with, for example, a curvature (which may be replaced with a radius of curvature, which is the same in the following description), a width, and a gradient of a road. The second map information 62 may be updated from time to time by causing the communication device 20 to communicate with an external device. The first map information 54 and the second map information 62 may be provided as unified map information. The map information may be stored in a storage 190.

The driving operator 80 includes, for example, a steering wheel, an accelerator pedal, and a brake pedal. The driving operator 80 may include a shift lever, a deformed steering wheel, a joystick, and other operators. For example, an operation detector that detects an amount of operation on an operator by an occupant or performing of an operation is attached to each operator of the driving operator 80. The operation detector detects, for example, a steering angle or a steering torque of the steering wheel and an amount of depression of the accelerator pedal or the brake pedal. The operation detector outputs results of detection to the automated driving control device 100 or output to some or all of the travel driving force output device 200, the brake device 210, and the steering device 220.

The automated driving control device 100 performs various types of driving control belonging to automated driving on the host vehicle M. The automated driving control device 100 includes, for example, a first controller 120, a second controller 160, an HMI controller 180, and a storage 190. The first controller 120, the second controller 160, and the HMI controller 180 are realized, for example, by causing a hardware processor such as a central processing unit (CPU) to execute a program (software). Some or all of these constituents may be realized by hardware (a circuit unit including circuitry) such as a large scale integration (LSI) circuit, an application-specific integrated circuit (ASIC), or a field-programmable gate array (FPGA), a graphics processing unit (GPU), or a system on chip (SOC) or may be cooperatively realized by software and hardware. The program may be stored in a storage device (a storage device including a non-transitory storage medium) such as an HDD or a flash memory of the automated driving control device 100 in advance, or may be stored in a removable storage medium such as a DVD, a CD-ROM, or a memory card and installed in a storage device of the automated driving control device 100 by setting the storage medium (non-transitory storage medium) into a drive device or a card slot.

The storage 190 may be realized by the aforementioned various storage devices or an electrically erasable programmable read only memory (EEPROM), a read only memory (ROM), a random access memory (RAM), or the like. For example, various types of information and programs in the embodiment are stored in the storage 190. Map information (for example, the first map information 54 and the second map information 62) may be stored in the storage 190.

Figure 2:
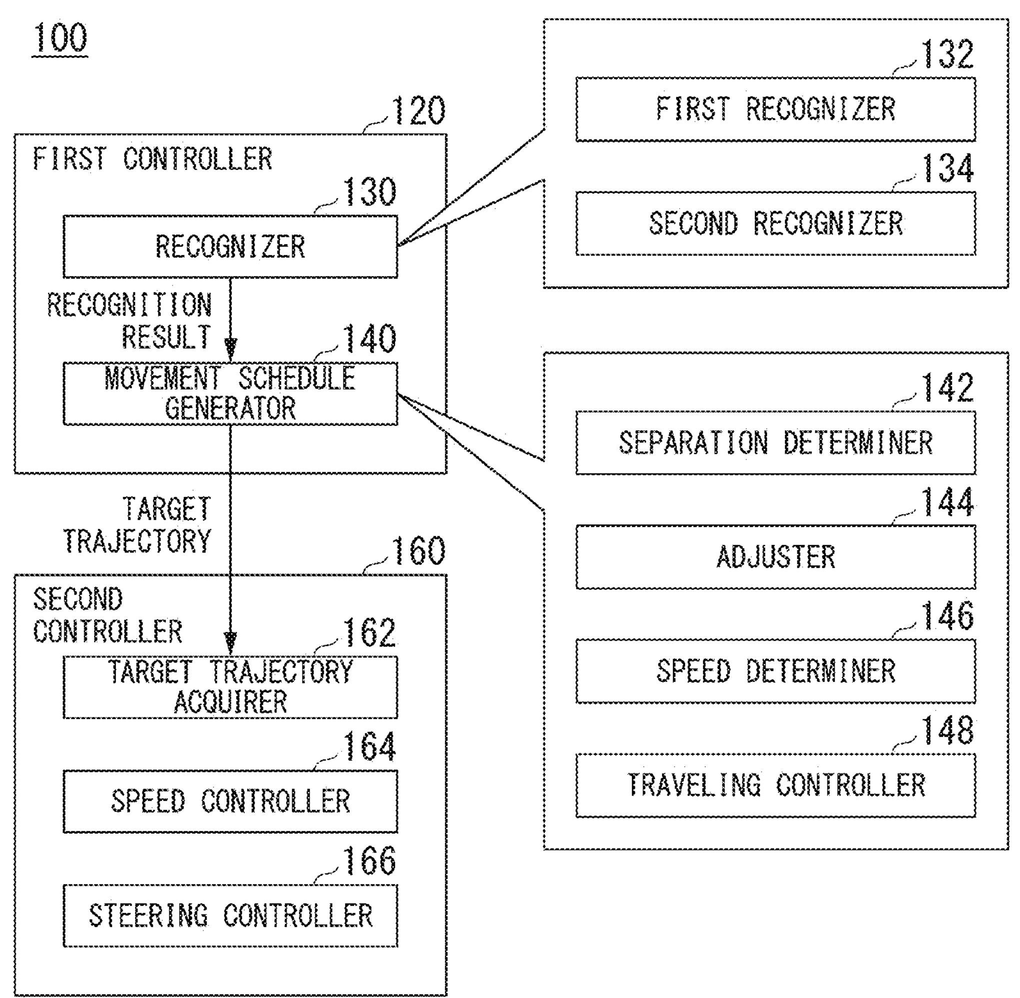
FIG. 2 is a diagram illustrating functional configurations of a first controller and a second controller.

FIG. 2 is a diagram illustrating functional configurations of the first controller 120 and the second controller 160. The first controller 120 includes, for example, a recognizer 130 and a movement schedule generator 140. For example, the first controller 120 is realized using a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched) together, scoring both recognitions, and comprehensively evaluating the recognitions. Accordingly, reliability of automated driving is secured. The first controller 120 performs control associated with automated driving of the host vehicle M, for example, on the basis of instructions from the MPU 60 or the HMI controller 180.

The recognizer 130 recognizes a surrounding situation of the host vehicle M on the basis of the result of recognition from the detection device DD (information input from the camera 10, the radar device 12, and the LIDAR device 14 via the object recognition device 16). For example, the recognizer 130 recognizes states such as a position, a speed, and an acceleration of an object near the host vehicle M (within a predetermined distance from the host vehicle M). Examples of the object include a traffic participant such as another vehicle (an example of another mobile object), a pedestrian, or a bicycle and a physical boundary defining a road (a moving lane). For example, a position of an object is recognized as a position in an absolute coordinate system with a representative point (such as the center of gravity or the center of a drive shaft) of the host vehicle M as an origin and is used for control. A position of an object may be expressed as a representative point such as the center of gravity or a corner of the object or may be expressed as an area. For example, when an object is a mobile object such as another vehicle, a "state" of the mobile object may include an acceleration or a jerk of the mobile object or a "moving state" (for example, whether the other vehicle is performing lane change or whether the other vehicle is going to perform lane change) thereof.

The recognizer 130 recognizes, for example, a stop line, a red signal, a toll gate, other road events, a marking (speed limit) marked on a road, or a road marking indicating a speed limit. The recognizer 130 includes, for example, a first recognizer 132 and a second recognizer 134. Details of these functions will be described later.

The movement schedule generator 140 generates a movement schedule in which the host vehicle M will travel through automated driving on the basis of the result of recognition from the recognizer 130. For example, the movement schedule generator 140 generates a target trajectory in which the host vehicle M will travel autonomously (without requiring a driver's operation) in the future such that the host vehicle M can travel in a recommended lane determined by the recommended lane determiner 61 in principle and cope with a surrounding situation of the host vehicle M on the basis of a surrounding road shape or the like based on the current position of the host vehicle M acquired from the recognition result from the recognizer 130 or the map information. The target trajectory includes, for example, a speed element. For example, the target trajectory is expressed by sequentially arranging points (trajectory points) at which the host vehicle M is to arrive. Trajectory points are points at which the host vehicle Mis to arrive at intervals of a predetermined traveling distance (for example, about several [m]) along a road, and a target speed and a target acceleration at every interval of a predetermined sampling time (for example, below the decimal point [sec]) are generated as a part of the target trajectory in addition thereto. The trajectory points may be positions at which the host vehicle M is to arrive at sampling times every predetermined sampling time. In this case, information of the target speed or the target acceleration is expressed by intervals between the trajectory points.

The movement schedule generator 140 may set events of automated driving in generating a target trajectory. The events of automated driving include, for example, a constant-speed traveling event in which the host vehicle M travels in the same lane at a constant speed, a following traveling event in which the host vehicle M travels to follow another vehicle which is present within a predetermined distance (for example, 100 [m]) in front of the host vehicle M and closest to the host vehicle M, a lane change event in which the host vehicle M changes a traveling lane to a neighboring lane, a branching event in which the host vehicle M travels to branch at a branching point of a road to a destination lane, a merging event in which the host vehicle M merges into a main road at a merging point, and a take-over event in which automated driving ends and is switched to manual driving. The events of automated driving may include, for example, an overtake event in which the host vehicle M changes the traveling lane to a neighboring lane, overtakes a preceding vehicle in the neighboring lane, and then changes the traveling lane to the original lane again and an avoidance event in which the host vehicle M is caused to perform at least one of braking and steering to avoid an obstacle in front of the host vehicle M.

The movement schedule generator 140 may change an event determined already for a current section to another event or set a new event for the current section, for example, on the basis of the surrounding situation of the host vehicle M recognized at the time of traveling of the host vehicle M. The movement schedule generator 140 may change an event determined already for a current section to another event or set a new event for the current section in response to an operation performed on the HMI 30 by an occupant. The movement schedule generator 140 generates a target trajectory based on the set event.

The movement schedule generator 140 includes, for example, a separation determiner 142, an adjuster 144, a speed determiner 146, and a traveling controller 148. The traveling controller 148, the second controller 160, and the HMI controller 180 are an example of a "moving controller." Details of these functions will be described later.

The second controller 160 controls the travel driving force output device 200, the brake device 210, and the steering device 220 such that the host vehicle M travels along the target trajectory generated by the movement schedule generator 140 as scheduled.

The second controller 160 includes, for example, a target trajectory acquirer 162, a speed controller 164, and a steering controller 166. The target trajectory acquirer 162 acquires information of the target trajectory (trajectory points) generated by the movement schedule generator 140 and stores the acquired information in a memory (not illustrated). The speed controller 164 controls the travel driving force output device 200 or the brake device 210 on the basis of a speed element accessory to the target trajectory stored in the memory. The steering controller 166 controls the steering device 220 on the basis of a curved state of the target trajectory stored in the memory. The processes of the speed controller 164 and the steering controller 166 are realized, for example, by feed-forward control and feedback control in combination. For example, the steering controller 166 performs control in combination of feed-forward control based on a curvature of a road in front of the host vehicle M and feedback control based on a separation from the target trajectory.

Referring back to FIG. 1, the HMI controller 180 notifies (informs) an occupant of predetermined information using the HMI 30. The predetermined information includes, for example, information associated with traveling of the host vehicle M such as information on the state of the host vehicle M or information on limitation of driving control (traveling control). The information on the state of the host vehicle M includes, for example, a speed, an engine rotation speed, and a shift position of the host vehicle M. The information on driving control includes, for example, information on an inquiry about whether driving control based on automated driving is to be performed or whether automated driving is to be started, information on a driving control situation based on automated driving, information on an automation level, and information for prompting an occupant to perform manual driving when automated driving is switched to manual driving. The predetermined information may include information on the surrounding situation recognized by the detection device DD. The predetermined information may include information not associated with traveling of the host vehicle M such as television programs and content (for example, movies) stored in a storage medium such as a DVD. The predetermined information may include, for example, a current position or a destination of the host vehicle M in automated driving and information on an amount of fuel remaining in the host vehicle M. The HMI controller 180 may output information received by the HMI 30 to the communication device 20, the navigation device 50, the first controller 120, and the like.

The HMI controller 180 may cause the HMI 30 to output the information on an inquiry of an occupant or process results from the first controller 120 and the second controller 160. The HMI controller 180 may transmit various types of information output from the HMI 30 to a terminal device used by an occupant of the host vehicle M via the communication device 20.

The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls these constituents on the basis of information input from the second controller 160 or information input from the accelerator pedal of the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or information input from the brake pedal of the driving operator 80 such that a brake torque based on a braking operation is output to vehicle wheels. The brake device 210 may include a mechanism for transmitting a hydraulic pressure generated by an operation on the brake pedal to the cylinder via a master cylinder as a backup. The brake device 210 is not limited to the above-mentioned configuration and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the steering wheel of the driving operator 80 to change the direction of the turning wheels.

[Recognizer and Movement Schedule Generator]

Details of the functions of the recognizer 130 (mainly the first recognizer 132 and the second recognizer 134) and the movement schedule generator 140 (mainly the separation determiner 142, the adjuster 144, the speed determiner 146, and the traveling controller 148) will be described below. In the following description, details of driving control (traveling control) of the host vehicle M using the functions of the recognizer 130 and the movement schedule generator will be described divisionally in several situations.

[First Situation]

Figure 3:
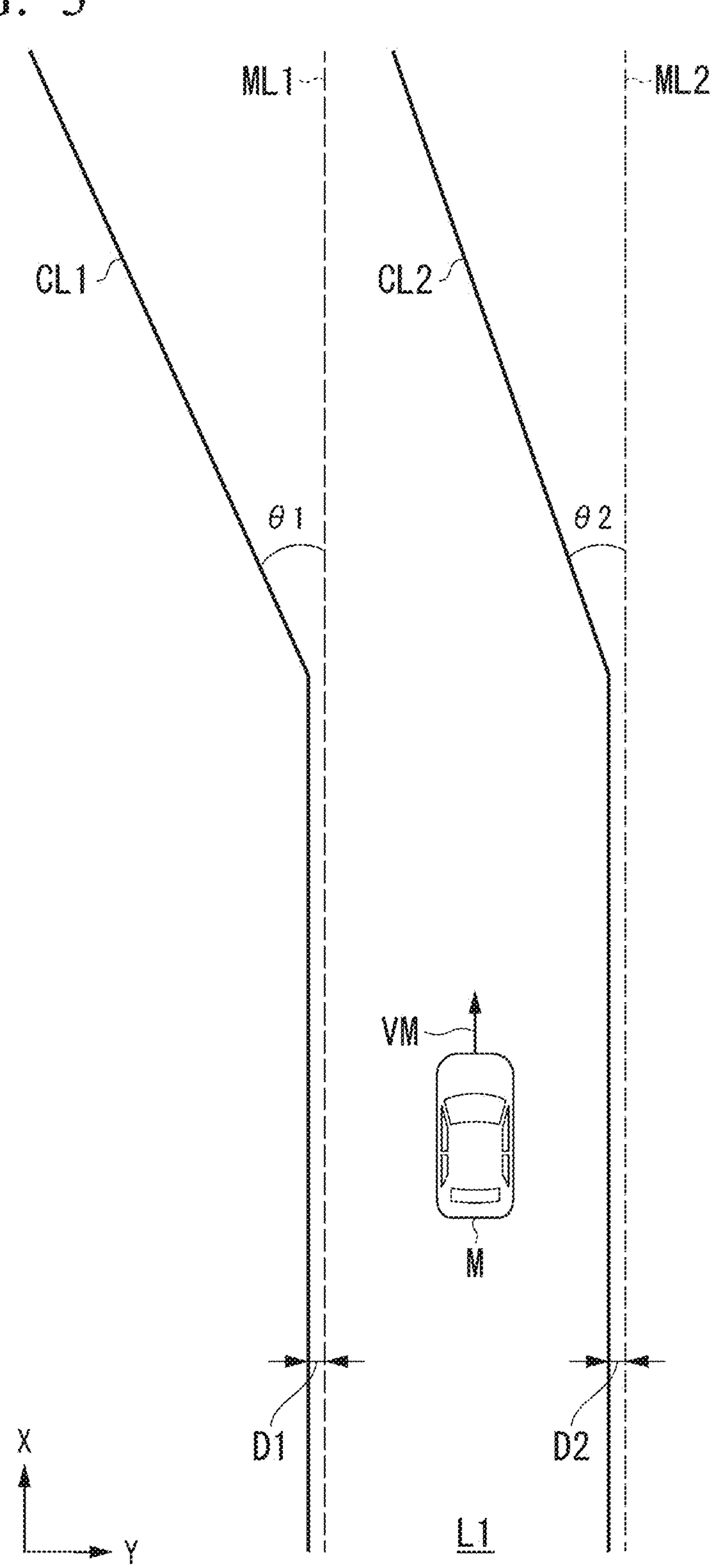
FIG. 3 is a diagram illustrating driving control of a host vehicle in a first situation.

FIG. 3 is a diagram illustrating driving control of the host vehicle M in a first situation. In the example illustrated in FIG. 3, marking lines CL1 and CL2 recognized by the detection device DD and marking lines ML1 and ML2 acquired from map information (for example, the second map information 62) on the basis of the position information of the host vehicle M are illustrated. In the map information, a lane L1 is defined by the marking lines ML1 and ML2. In the example illustrated in FIG. 3, the marking lines CL1 and CL2 are an example of a "first marking line," and the marking lines ML1 and ML2 are an example of a "second marking line." In the following description, the marking lines CL1 and CL2 may be referred to as "camera marking lines CL1 and CL2," and the marking lines ML1 and ML2 may be referred to as "map marking lines ML1 and ML2." The camera marking lines CL1 and CL2 may be simply referred to as "camera marking lines CL" when they are not distinguished, and the map marking lines ML1 and ML2 may be simply referred to as "map marking lines ML" when they are not distinguished.

The first recognizer 132 recognizes a surrounding situation of the host vehicle M on the basis of an output of the detection device DD having detected the surrounding situation (the outside) of the host vehicle M. For example, the first recognizer 132 recognizes left and right camera marking lines CL1 and CL2 defining the traveling lane (a moving lane, a lane L1) of the host vehicle M on the basis of an image captured by the camera 10 (hereinafter referred to as a camera image). When there is a neighboring lane which is adjacent to the lane L1, the first recognizer 132 may recognize camera marking lines defining the neighboring lane.

For example, the first recognizer 132 analyzes the camera image, extracts edge points with large differences in luminance from neighboring pixels in the image, and recognizes the camera marking lines CL1 and CL2 in an image plane by connecting the edge points. The first recognizer 132 converts positions of the camera marking lines CL1 and CL2 to a vehicle coordinate system (for example, XY plane coordinates in FIG. 3) with a position of a representative point of the host vehicle M as an origin.

The first recognizer 132 may recognize, for example, curvatures of the camera marking lines CL1 and CL2. The camera marking lines CL1 and CL2 may be recognized or corrected on the basis of an output from a detection device (for example, the radar device 12 or the LIDAR device 14) other than the camera 10. The first recognizer 132 may recognize changes in curvature of the camera marking lines CL1 and CL2. The changes in curvature are, for example, rates of change of curvature over time of the camera marking lines CL1 and CL2 recognized by the camera 10 at x [m] in front of the host vehicle M. The first recognizer 132 may recognize a curvature or a change in curvature of a lane defined by the camera marking lines CL1 and CL2 by averaging the curvatures or the changes in curvature of the camera marking lines CL1 and CL2. The camera marking lines CL1 and CL2 may be recognized or corrected on the basis of an output from a detection device (for example, the radar device 12 or the LIDAR device 14) other than the camera 10.

The first recognizer 132 recognizes an object (for example, a physical boundary or another vehicle (an example of another mobile object)) which is present near the host vehicle M. The first recognizer 132 may recognize an object which the host vehicle M is likely to collide with in traveling in the future out of the recognized objects as an obstacle. For example, when a collision margin value based on a position and a speed VM of the host vehicle M and a position and a speed of an object is less than a threshold value, the first recognizer 132 determines that the host vehicle is likely to collide with the object and recognizes the object as an obstacle. The collision margin value is, for example, a collision margin time (time to collision (TTC)) and is derived by dividing a relative distance between the host vehicle M and another vehicle by a relative speed therebetween. When it is recognized on the basis of a position and a speed of an object that a future position (a position after a predetermined time elapses) is present in the traveling lane of the host vehicle M, the first recognizer 132 may recognize the object as an obstacle.

The second recognizer 134 recognizes, for example, marking lines of a lane near the host vehicle M from the map information on the basis of the position of the host vehicle M detected by the vehicle sensor 40 or the GNSS receiver 51. For example, the second recognizer 134 recognizes map marking lines ML1 and ML2 which are preset in a traveling direction of the host vehicle M or in a direction in which the host vehicle M can travel with reference to the map information on the basis of the position information of the host vehicle M.

The second recognizer 134 recognizes the map marking lines ML1 and ML2 as marking lines defining the lane L1. When a neighboring lane adjacent to the lane L1 is present, the second recognizer 134 may recognize marking lines defining the neighboring lane. The second recognizer 134 recognizes a curvature or a change in curvature of each of the map marking lines ML1 and ML2 from the second map information 62. The second recognizer 134 may recognize a curvature or a change in curvature of the lane defined by the map marking lines by averaging the curvatures or the changes in curvature of the map marking lines ML1 and ML2.

The separation determiner 142 determines whether the camera marking lines CL1 and CL2 recognized by the first recognizer 132 are separated from the map marking lines ML1 and ML2 recognized by the second recognizer 134. For example, the separation determiner 142 derives a degree of separation between the marking lines CL1 and ML1 which are leftward closest to the host vehicle M and a degree of separation between the marking lines CL2 and ML2 which are rightward closest to the host vehicle M. Then, the separation determiner 142 determines that the camera marking lines CL are separated from the map marking lines ML when the derived degrees of separation are equal to or greater than a threshold value and determines that both marking lines are not separated when the degrees of separation are less than the threshold value. Determination of whether they are separated may be repeatedly performed at predetermined timings or at intervals of a predetermined period.

For example, the separation determiner 142 overlaps the camera marking lines CL1 and CL2 and the map marking lines ML1 and ML2 on a plane (an XY plane) of the vehicle coordinate system with the position of the representative point of the host vehicle M as a reference. When marking lines to be compared (marking lines CL1 and ML1 and marking lines CL2 and ML2) are determined, the separation determiner 142 determines that the marking lines are separated when at least one degree of separation between the corresponding marking lines is equal to or greater than the threshold value and determines that the marking lines are not separated when all the degrees of separation between the corresponding marking lines are less than the threshold value. A degree of separation is, for example, an amount of deviation (a separation distance, a deviation in a width direction of a moving lane) in a road width direction (a moving lane width direction, a lateral direction, or the Y-axis direction in the drawing). In the example illustrated in FIG. 3, the separation determination may be performed using an average value of an amount of deviation in lateral position D1 between the marking lines CL1 and ML1 and an amount of deviation in lateral position D2 between the marking lines CL2 and ML2 or may be performed using a maximum value or a minimum value of the amounts of deviation D1 and D2.

The degree of separation may be, for example, an amount (magnitude) of angle formed by two marking lines to be compared instead of (or in addition to) the amounts of deviation in lateral position. In the example illustrated in FIG. 3, an average value of an angle θ1 formed by the marking lines CL1 and ML1 and an angle θ2 formed by the marking lines CL2 and ML2 may be used, or a maximum value or a minimum value of the angles θ1 and θ2 may be used.

The degree of separation may be a degree (magnitude) of difference in a change in curvature between the marking lines instead of (or in addition to) the amounts of deviation in lateral position or the angles formed by the marking lines. A change in curvature is mainly used when the lane is a curved road. For example, the separation determiner 142 may use an average value of a difference of the change in curvature between the marking lines CL1 and ML1 and a difference of the change in curvature between the marking lines CL2 and ML2 or may use a maximum value or a minimum value of the differences. The separation determiner 142 may use a difference between the average value of the changes in curvature of the marking lines CL1 and CL2 and the average value of the changes in curvature of the marking lines ML1 and ML2. A difference between the change in curvature of the lane L1 recognized from the camera image and the change in curvature of the lane recognized from the map information may be used.

For example, when it is determined whether a camera marking line and a map marking line are separated, the separation determiner 142 may determine whether the camera marking line has been erroneously recognized on the basis of one or both of the change in curvature of the camera marking line detected by the recognizer 130 and the angle formed by the camera marking line and the map marking line. In this case, for example, when a changing direction of the change in curvature and a changing direction of the angle are the same and the change in curvature and the angle increase with an increase in a distance from the host vehicle M, the separation determiner 142 determines whether the camera marking line has been erroneously recognized. Accordingly, since erroneous recognition is determined when both of the change in curvature and the angle increase, it is possible to more accurately determine whether the camera marking lines have been erroneously recognized when the host vehicle travels in a lane change section such as a curved road.

When recognition states of the camera marking lines CL and the map marking lines ML defining the lane L1 in which the host vehicle M is present by the recognizer (the first recognizer 132 and the second recognizer 134) satisfy predetermined conditions, the adjuster 144 moves the camera marking lines CL or the map marking lines ML to adjust the positions thereof such that the position of the camera marking lines CL and the map marking lines ML with respect to the host vehicle M match (the positions match completely and with a predetermined error range in addition). The speed determiner 146 determines whether a moving speed when the adjuster 144 moves the camera marking lines CL or the map marking lines ML is equal to or greater than a 5 predetermined speed. Specific examples of the functions of the adjuster 144 and the speed determiner 146 will be described later.

The traveling controller 148 determines driving control (traveling control) for the host vehicle M on the basis of the recognition results from the first recognizer 132 and the second recognizer 134 or the process results from the separation determiner 142, the adjuster 144, and the speed determiner 146 and generates a target trajectory based on the determined driving control. "Determining driving control" may include, for example, determining details (types) of the driving control or determining whether driving control is to be performed (or to be limited). "Performing driving control" may include, for example, continuing to perform driving control in execution in addition to switching and performing details of driving control. "Limiting driving control" may include lowering an automation level of driving control in addition to not performing driving control.

Here, the driving control performed by the traveling controller 148 includes at least first driving control and second driving control. The first driving control is, for example, driving control in which at least steering of the steering and the speed of the host vehicle M is controlled on the basis of at least one of the camera marking lines CL and the map marking lines ML. For example, in ALC control which is the first driving control, a traveling trajectory along which the host vehicle M changes a lane from the traveling lane (for example, the lane L1) to a lane which is a lane change destination (a course change destination) is generated, and the host vehicle M is caused to travel such that the representative point of the host vehicle M travels along a trajectory corresponding to the generated traveling trajectory. In LKAS control which is the first driving control, the host vehicle M is caused to travel such that the representative point of the host vehicle M passes through the center of the lane defined by the marking lines. In the first driving control, for example, the driving control may be performed with priority given to the map marking lines ML when camera recognition accuracy is less than a threshold value, and the driving control may be performed with priority given to the camera marking lines CL when the map information is old (for example, when the map update date is earlier than a predetermined date and time).

The second driving control is, for example, driving control in which at least steering of the steering and the speed of the host vehicle M is controlled on the basis of an object (for example, a physical boundary or another vehicle) recognized by the first recognizer 132. For example, in the second driving control, a position of a lane is identified on the basis of the position of the physical boundary or the other vehicle, and the host vehicle M is caused to travel such that the representative point of the host vehicle M travels along the center of the identified lane. In the second driving control, the host vehicle M is caused to travel such that the representative point of the host vehicle M travels along a trajectory corresponding to a traveling trajectory of the other vehicle.

The driving control may include a plurality of types of driving control with different automation levels (an example of a degree of automation). The automation levels include, for example, a first level, a second level in which the degree of automation of driving control is lower than that of the first level, and a third level in which the degree of automation of driving control is lower than that of the second level. The automation levels may include a fourth level in which the degree of automation of driving control is lower than that of the third level. Here, an automation level may be a level which is defined by standardized information, regulations, or the like or may be an index value which is set regardless thereof. Accordingly, types, details, and the number of automation levels are not limited to the following example. When it is mentioned that a degree of automation in driving control is low, for example, it means that an automation percentage in driving control is small and tasks imposed on a driver are large (heavy). When it is mentioned that automation in driving control is low, it means that a degree of control in which the automated driving control device 100 controls steering or acceleration/deceleration of the host vehicle Mis low (a degree of necessity in which a driver needs to intervene in a steering operation or an accelerating/decelerating operation is high). A task imposed on a driver is, for example, surrounding monitoring of the host vehicle M or an operation on the driving operator. The operation on the driving operator includes, for example, a state (hereinafter referred to as a hands-on state) in which the driver grasps the steering wheel. A task imposed on a driver is, for example, a task (a driver task) for an occupant required to maintain automated driving of the host vehicle M. Accordingly, when an imposed task cannot be performed by an occupant, the automation level is lowered. For example, driving control of the first level may include, for example, driving control such as ALC, LKAS, ACC, TJP, and CMBS. Driving control of the second or third level may include, for example, driving control such as ALC, LKAS, ACC, and CMBS. Driving control of the fourth level may include manual driving. In the driving control of the fourth level, for example, driving control such as ACC and CMBS may be performed. Out of the first to fourth levels, the first level is the highest degree of automation in driving control, and the fourth level is the lowest degree of automation in driving control.

In the first level, since there is no task which is imposed on an occupant (the task imposed on an occupant is the lightest), for example, driving control in a state in which a driver of the host vehicle M does not grasp the steering wheel (hereinafter referred to as a hands-off state) is permitted. A task which is imposed on a driver in the second level is, for example, surrounding (particularly, forward) monitoring of the host vehicle M. A task which is imposed on a driver in the third level includes, for example, a hands-on state in addition to the surrounding monitoring state of the host vehicle M. A task which is imposed on a driver in the fourth level includes, for example, an operation for controlling the steering and the speed of the host vehicle M using the driving operator 80 in addition to the surrounding monitoring state of the host vehicle M and the hands-on state. That is, in the fourth level, driving control can be immediately handed over to manual driving by an occupant, and the task imposed on an occupant is the heaviest. Details of driving control and tasks imposed on a driver in each automation level are not limited to the aforementioned example. The automated driving control device 100 performs driving control of one of the first to fourth levels on the basis of the surrounding situation of the host vehicle M or a task which is being performed by an occupant.

For example, the traveling controller 148 performs the first driving control when the separation determiner 142 determines that the camera marking lines CL and the map marking lines ML are not separated and performs the second driving control when it is determined that the camera marking lines CL and the map marking lines ML are separated. For example, when predetermined conditions are satisfied, the traveling controller 148 may perform control for switching the first driving control to the second driving control or may perform control for ending the driving control for the host vehicle M and switching the driving control to manual driving by an occupant or the like. The traveling controller 148 may switch the automation level according to the surrounding situation or the type of the driving control.

When driving control is being performed in a state in which the camera marking lines CL and the map marking lines ML are not separated, an amount of deviation with which it is determined that the camera marking lines CL and the map marking lines ML are not separated (a deviation in which a separation distance or a separation angle is equal to or less than a predetermined amount) may be caused due to change in behavior of the host vehicle M while traveling or change of a road. In this case, for example, the adjuster 144 moves one marking line (for example, the map marking line) such that the position of the camera marking line CL and the position of the map marking line ML match (with a predetermined error range). This movement includes movement in the lateral direction of a moving lane (a moving lane width direction) or rotational movement in which an angle with respect to the reference direction is moved. The adjuster 144 increases the moving speed as the amount of deviation increases. Accordingly, it is possible to match the marking lines for a short time and to continue to perform driving control.

When details of driving control are changed or the automation level is switched to limit the driving control, the traveling controller 148 may cause the HMI controller 180 to notify an occupant of information (an image or sound) on limitation of driving control.

[Second Situation]

Figure 4:
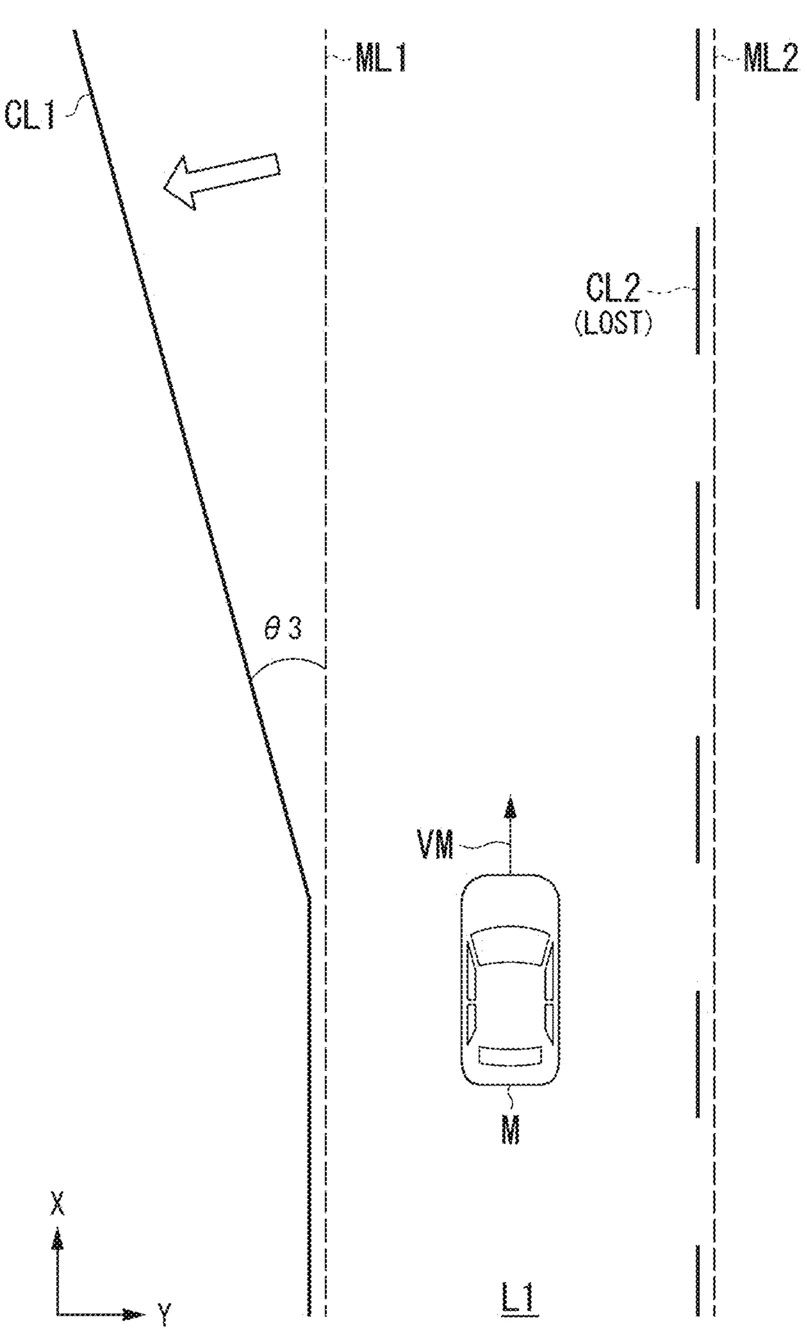
FIG. 4 is a diagram illustrating driving control of a host vehicle in a second situation.

Driving control of the host vehicle M in a second situation will be described below. FIG. 4 is a diagram illustrating driving control of the host vehicle M in the second situation. In FIG. 4, the host vehicle M is traveling at a speed VM in a lane L1 defined by the map marking lines ML1 and ML2. At a timing before the second situation, it is assumed that the separation determiner 142 determines that the camera marking lines CL and the map marking lines ML on the left and right sides of the host vehicle M are not separated and driving control such as LKAS based on the map marking lines ML1 and ML2 is being performed through the first driving control.

Here, it is assumed that recognition states of the right and left marking lines of the lane L1 in front of the host vehicle M in the second situation are states in which the camera marking line CL1 and the map marking line ML1 on one side (the left side in the drawing) are recognized and only the map marking line ML2 on the other side (the right side in the drawing) is recognized. In other words, in the second situation, the right camera marking line CL2 in front of the host vehicle M is not recognized by the first recognizer 132 (recognition is lost) due to low recognition accuracy or abrasion of the marking line. The second situation represents a situation in which there is a deviation between the camera marking line CL1 and the map marking line ML1 which have been recognized. An amount of deviation (a separation angle θ3) is assumed to be an amount of deviation with which it is determined that they are not separated. The second situation is an example of a situation in which the recognition states of the camera marking lines CL and the map marking lines ML satisfy the predetermined conditions.

In this case, for example, the adjuster 144 moves the map marking line ML1 to match the position of the camera marking line CL1, and the traveling controller 148 continues to perform traveling of the host vehicle on the basis of a lane defined by the moved map marking line ML1.

Specifically, first, the adjuster 144 moves the position of the map marking line ML1 such that the angle θ3 formed by the extending directions of the camera marking line CL1 and the map marking line ML1 on the left side of the host vehicle M is less than a predetermined angle. Specifically, the map marking line ML1 is rotated to left in the drawing such that the angle θ3 is less than the predetermined angle.

Figure 5:
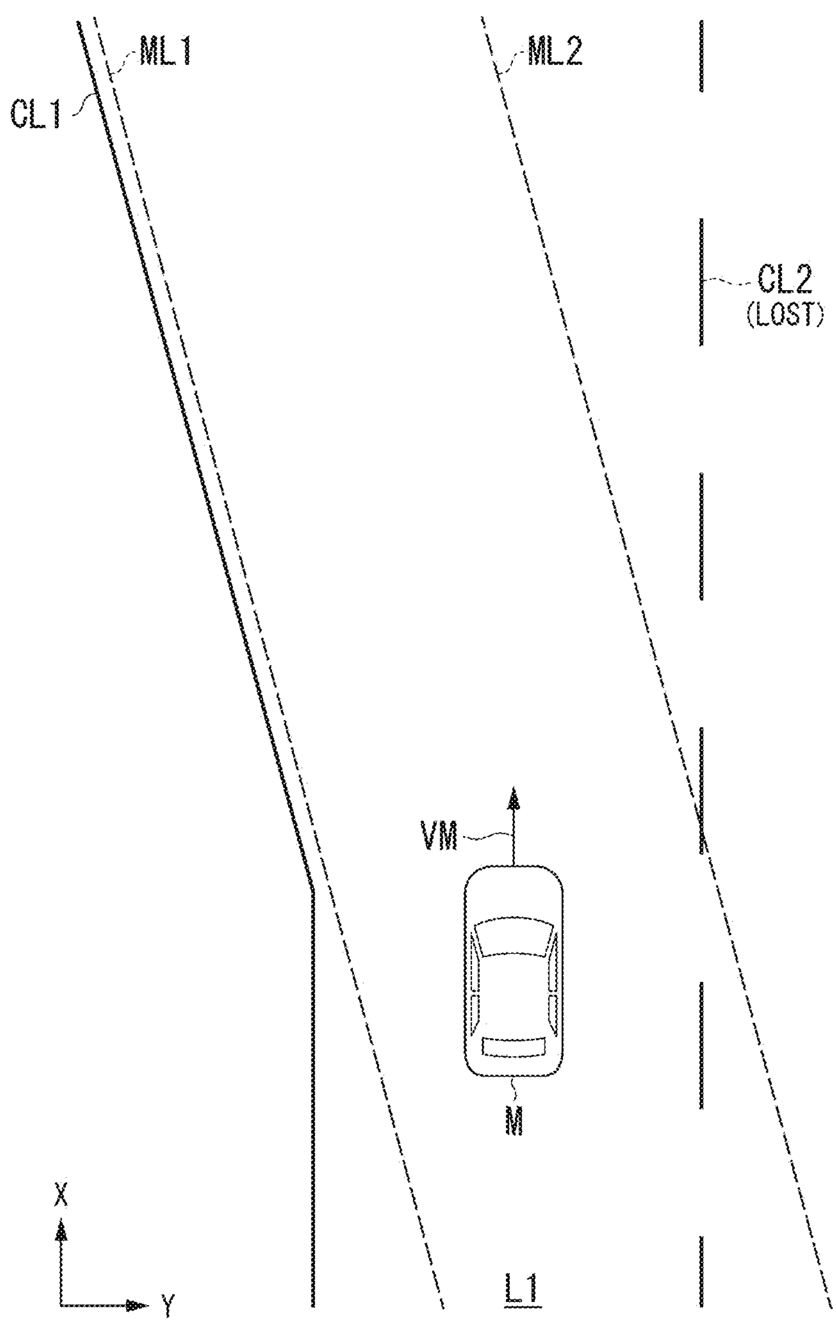
FIG. 5 is a diagram illustrating an example of a result when a map marking line has been moved to match an extending direction of a camera marking line.

The adjuster 144 rotationally moves the map marking line ML2 on the right side of the lane L1 similarly to the map marking line ML1. FIG. 5 is a diagram illustrating an example of a result when the map marking lines ML1 and ML2 have been moved to match the extending direction of the camera marking line CL. The adjuster 144 moves the map marking line ML2 such that the map marking line ML1 and the map marking line ML2 are located parallel to each other to correspond to the movement position of the map marking line ML1. For example, the adjuster 144 may simultaneously move the map marking lines ML1 and ML2. Accordingly, it is possible to adjust the position with a maintained lane width of the lane L1. The adjuster 144 acquires a moving speed when the map marking line ML1 is moved. The moving speed in the second situation is a rotational angular velocity when the map marking line ML1 is rotated.

The speed determiner 146 determines whether the moving speed (the rotational angular velocity) when the adjuster 144 moves the map marking line ML1 is equal to or greater than a predetermined speed. When the speed determiner 146 determines that the moving speed is not equal to or greater than the predetermined speed (less than the predetermined speed), the traveling controller 148 continues perform traveling control which is being performed by the host vehicle M regardless of whether there is a nearby obstacle. When the moving speed is equal to or greater than the predetermined speed, different types of traveling are performed when an obstacle is present near the host vehicle M and when an obstacle is not present near the host vehicle M as illustrated in third and fourth situations which will be described later.

[Third Situation]

Figure 6:
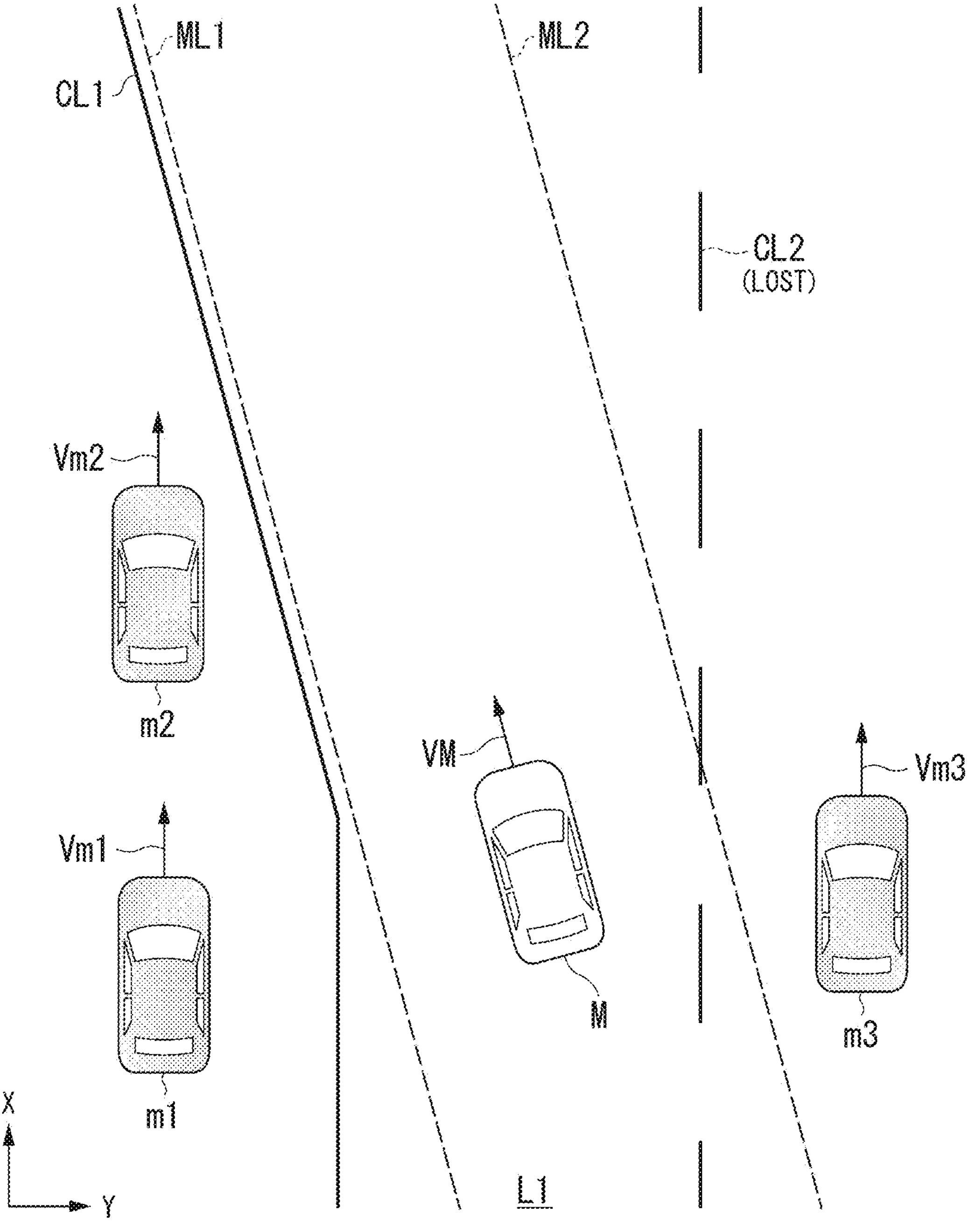
FIG. 6 is a diagram illustrating driving control of a host vehicle in a third situation.

FIG. 6 is a diagram illustrating driving control of the host vehicle M in a third situation. The third situation is different from the second situation in that there are other vehicles m1 to m3 near the host vehicle M. In the following description, differences from the second situation will be mainly described, and description of the same as details described above in the second situation will be omitted. The same is true of a fourth situation which will be described later. In the third situation, the map marking lines ML1 and ML2 have been moved to correspond to the position of the camera marking line CL1, and the direction of the host vehicle M has been changed to correspond to the positions (extending direction) of the moved map marking lines ML1 and ML2. In the third situation, it is assumed that the first recognizer 132 recognizes the other vehicles m1 and m2 are obstacles on the basis of the position and the speed MV of the host vehicle M and positions and speeds Vm1 to Vm3 of the other vehicles m1 to m3. The "case in which the other vehicles m1 and m2 are recognized as obstacles" may include, for example, a case in which the other vehicles will be recognized as obstacles in the near future (for example, in several seconds) in addition to a case in which the other vehicles are recognized as obstacles at the current time point. For example, when future positions of the other vehicles m1 and m2 based on the positions and the speeds Vm1 and Vm2 of the other vehicles m1 and m2 are located in the extending direction of the camera marking line CL1, the extending direction of the map marking line ML1 moved to correspond to the camera marking line CL1, or the extending direction of the lane defined by the moved map marking lines ML1 and ML2, the other vehicles m1 and m2 are recognized as obstacles. When predicted future trajectories of the other vehicles m1 and m2 interfere with a predicted future trajectory of the host vehicle M, the other vehicles m1 and m2 may be recognized as obstacles.

In the third situation, when the moving speed for causing the position of the map marking line ML1 to match the position of the camera marking line CL1 is equal to or greater than the predetermined speed and obstacles (the other vehicles m1 and m2 in the example illustrated in FIG. 6) are present near the host vehicle M, the traveling controller 148 performs at least one of limitation of driving control (traveling control) and notification associated with the limitation of driving control.

Limitation of driving control includes ending (stopping) driving control in execution or lowering the automation level (lowering the degree of automation of driving control). Notification associated with the limitation of driving control is performed by the HMI controller 180 by causing the traveling controller 148 to instruct the notification to the HMI controller 180. The notification associated with the limitation of driving control may include, for example, notifying that an obstacle is present in the traveling direction (in front) of the host vehicle M or that an occupant state based on the automation level is prompted (for example, the hands-on state is prompted) in addition to notifying of details of driving control to be limited (or changed). The notification includes at least one of notification using image display and notification using sound (alarm) output. For example, the traveling controller 148 may first perform one of the limitation of driving control and the notification and perform the other after a predetermined time elapses therefrom or may simultaneously perform both. The traveling controller 148 may perform one or both of the limitation of driving control and the notification according to a road situation or a moving speed or an amount of movement of the marking line. Whether to perform notification or the types of notification (only an image, only sound, or both) may be set by an occupant of the host vehicle M. Accordingly, when there is an obstacle immediately after the traveling direction of the host vehicle M has been changed with movement of the map marking lines ML1 and ML2, it is possible to perform limitation of driving control, notification associated with the limitation, or the like at a more appropriate timing. As a result, it is possible to perform more appropriate moving control according to the surrounding situation of the host vehicle M.

[Fourth Situation]

Figure 7:
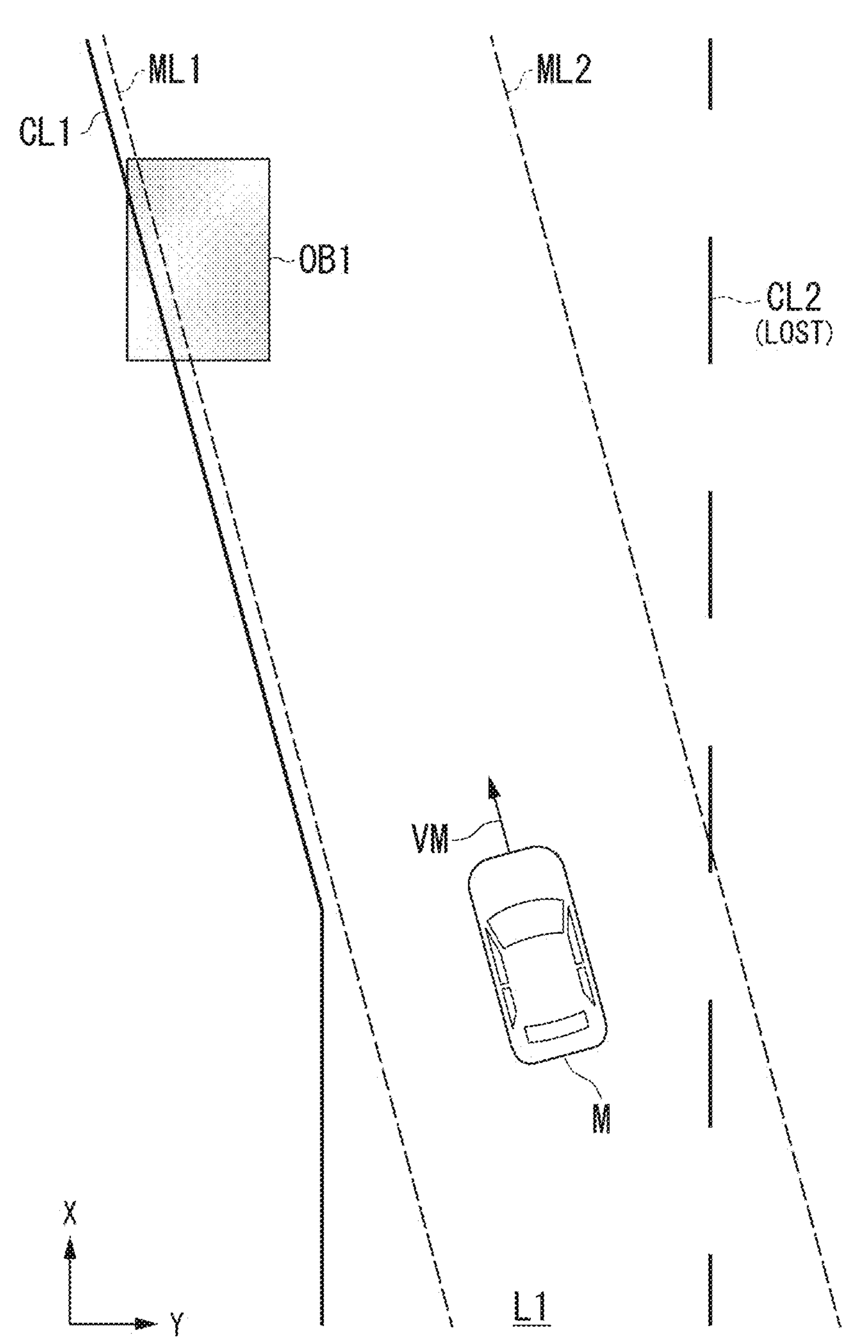
FIG. 7 is a diagram illustrating driving control of a host vehicle in a fourth situation.

FIG. 7 is a diagram illustrating driving control of the host vehicle M in a fourth situation. The fourth situation is different from the second situation in that there is an object OB1 in the extending direction of the camera marking line CL1 (or the moved map marking line ML1). The object OB1 is, for example, a stationary object and is an object with a size, a material, or a shape over which the host vehicle M is recognized not to pass by the recognizer 132 (which needs to be avoided). In the fourth situation, the object OB1 is recognized as an obstacle by the first recognizer 132.

In the fourth situation, when the moving speed for causing the position of the map marking line ML1 to match the position of the camera marking line CL1 is equal to or greater than the predetermined speed and an obstacle (an object OB1 in the example illustrated in FIG. 6) is present in the extending direction of the camera marking line CL1 (or the moved map marking line ML1), the traveling controller 148 performs at least one of limitation of driving control and notification associated with the limitation of driving control similarly to the third situation.

As in the third and fourth situations, when the moving speed for causing the position of the map marking line ML1 to match the position of the camera marking line CL1 is equal to or greater than the predetermined speed and an obstacle is not present near the host vehicle M, the traveling controller 148 does not perform at least the limitation of driving control but continues to perform the driving control in execution. In this situation, since the moving speed of the map marking line ML is equal to or greater than the predetermined speed, an error (an angular velocity deviation) equal to or greater than a threshold value may temporarily occur in a rotational angular velocity (an estimated angular velocity) of the position of the host vehicle M which is estimated on the basis of movement of the map marking line ML1 and a rotational angular velocity (a measured angular velocity or a yaw rate) which is actually measured by the vehicle sensor 40. Since the behavior of the host vehicle M staggers due to the error, notification of an alarm or the like may not be performed even if there is no obstacle. That is, the traveling controller 148 performs control for curbing notification when there is no obstacle and may perform the notification while maintaining the driving control when the moving speed for causing the position of the map marking line ML1 to match the position of the camera marking line CL1 is equal to or greater than the predetermined sped. Curbing the notification includes not performing notification or delaying a timing of notification. Since the error decreases by delaying the timing of notification (with the elapse of time), the notification may not be performed as a result. Accordingly, it is possible to curb excessive notification of an occupant.

As in the second to fourth situations, in the embodiment, when a deviation occurs in the angle formed by the extending directions of the camera marking line CL1 and the map marking line ML1 in a state in which the camera marking line CL1 and the map marking line ML1 are not separate (match) on one side of the lane L1 according to the surrounding situation of the host vehicle M, the map marking line ML1 is rotated to match the position of the camera marking line CL1, and continuing to perform driving control (traveling control) in execution is achieved. At this time, when the rotation speed of the map marking line is equal to or greater than the predetermined speed, the driving control in execution continues to be performed only when there is no nearby obstacle, and the driving control continues to be performed regardless of whether there is an obstacle when the rotation speed is equal to or less than the predetermined speed. Accordingly, it is possible to curb immediately performing limitation of driving control or notification of an occupant because a deviation occurs between the camera marking line CL1 and the map marking line ML1. As a result, it is possible to realize more appropriate driving control according to the surrounding situation.

MODIFIED EXAMPLES

In the aforementioned embodiment, the moving speed when the map marking line ML1 is rotationally moved to match the position of the camera marking line CL1 is used, and a moving speed when movement is performed to match the positions in association with a deviation in lateral position may be used. In the aforementioned embodiment, the moving speed when the camera marking line CL1 is moved to match the map marking line ML1 instead of moving the map marking line ML1 is performed may be used.

In the embodiment, as the moving speed of the marking line to be moved, the estimated position of the host vehicle M (a direction or an angular velocity with respect to the direction of the host vehicle before moving the marking line) based on movement of the marking line may be used instead of the rotational angular velocity of the marking line, the rotational angular velocity (the measured angular velocity) measured by the vehicle sensor 40 of the host vehicle M may be used, or an error (an angular velocity deviation) between the estimated angular velocity and the measured angular velocity may be used.

Figure 8:
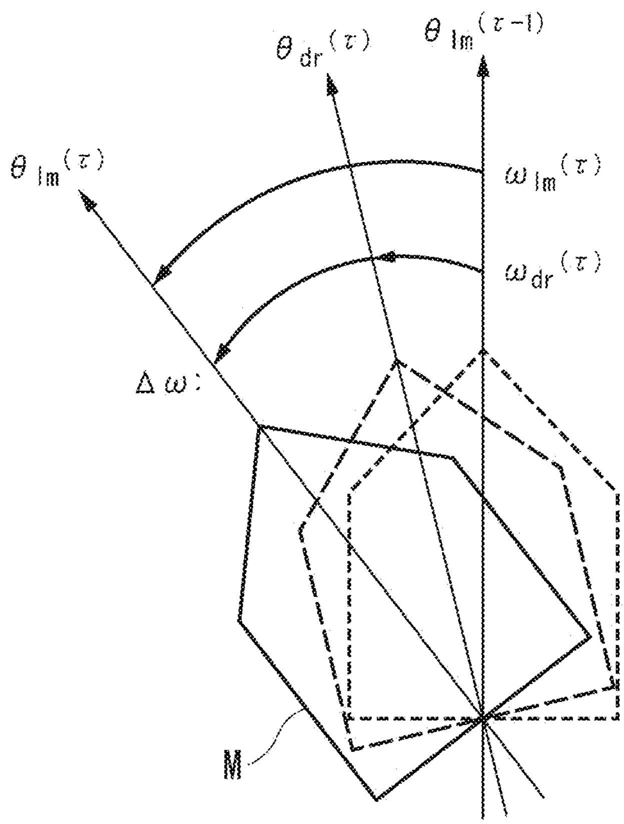
FIG. 8 is a diagram illustrating an angular velocity deviation.

FIG. 8 is a diagram illustrating an angular velocity deviation. In the example illustrated in FIG. 8, the shape of the host vehicle Mis simplified. For example, as in the second to fourth situations, it is assumed that the map marking lines ML1 and ML2 are rotated to left in the drawing to match the position of the camera marking line CL1. In this case, the direction of the host vehicle M is rotated to left such that the host vehicle M travels along the map marking lines ML1 and ML2. Here, in the example illustrated in FIG. 8, an angular velocity $\omega dr(\tau)$ denotes an angular velocity (a measured angular velocity) measured by an inner sensor (the vehicle sensor 40) provided in the host vehicle M, and an angular velocity $\omega lm(\tau)$ denotes a self-position angular velocity (the estimated angular velocity) estimated on the basis of movement of the map marking lines ML.

For example, the adjuster 144 calculates an angular velocity deviation $\Delta\omega$ $(=\omega\tau lm(\tau)-\omega dr(\tau))$ between the angular velocity $\omega dr(\tau)$ (an extending direction $\theta dr(\tau)$) and the angular velocity $\omega lm(\tau)$ (an extending direction $\theta lm(\tau)$) with movement of the map marking lines ML1 and ML2 from the extending direction $\theta lm(\tau-1)$ before the rotational movement to the extending direction $\theta dr(\tau)$ after the rotational movement. The speed determiner 146 considers the angular velocity $\omega dr(\tau)$, the angular velocity @lm(τ), or the angular velocity deviation $\Delta\omega$ as the moving speed and performs determination in the same way as described above.

For example, when the direction of the host vehicle M is estimated after the map marking line ML has matched the camera marking line CL, the angular velocity $\omega lm(\tau)$ based on the rotational angular velocity of the map marking line ML and the angular velocity $\omega dr(\tau)$ based on the measurement result from the vehicle sensor 40 are not equal, and thus the direction of the host vehicle M with respect to the marking line is estimated by a complementary filtering process or the like. The rotation angle of the map marking line ML is less than an angle difference (a gap) between the camera marking line CL and the map marking line ML. In the embodiment, as the gap increases, the map marking line ML is rotated and thus the rotation speed of the map marking line ML increases, but a time constant of a complementary filter may be changed on the basis of the surrounding situation such as a road shape and weights of the angular velocity $\omega lm(\tau)$ and the angular velocity $\omega dr(\tau)$ may be changed. Accordingly, with the same gap, the value of the angular velocity deviation $\Delta\omega$ can be adjusted according to the situation.

In the embodiment, when an angle difference occurs between the camera marking line and the map marking line, an error is caused between the estimated self-position direction and the measured angle, and there is a likelihood that the behavior of the host vehicle M will stagger due to the error. Accordingly, for example, when the angular velocity deviation $\Delta\omega$ is equal to or greater than a threshold value, driving control may continue to be performed on the basis of a moving trajectory (a traveling history) of the host vehicle M before the angle deviation has occurred between the camera marking line and the map marking line. Accordingly, it is possible to curb staggering of the behavior of the host vehicle M by curbing an increase of the error between the estimated angular velocity and the measured angular velocity.

In a modified example of the embodiment, it may be determined whether the camera marking line CL and the map marking line ML match instead of determining whether the camera marking line CL and the map marking line ML are separated. In the embodiment, at least one of the steering and the speed of the host vehicle M may be controlled to avoid collision with an object recognized by the recognizer 130 in addition to the aforementioned traveling control.

[Process Flow]

A process flow that is performed by the automated driving control device 100 according to the embodiment will be described below. In the following description, a driving control (traveling control) process based on a recognition state of a marking line or the like out of processes performed by the automated driving control device 100 will be mainly described below. When the process flow starts, it is assumed that the host vehicle M is performing, for example, predetermined driving control (for example, LKAS control in a first driving state (for example, a driver's hands-off state)). The following process flow may be repeatedly performed at predetermined timings or at intervals of a predetermined period (for example, while driving control is being performed by the automated driving control device 100).

FIG. 9 is a flowchart illustrating an example of a process flow of the driving control process according to the embodiment. In the example illustrated in FIG. 9, the first recognizer 132 recognizes a surrounding situation including a marking line (a camera marking line CL) near the host vehicle M on the basis of an output from the detection device DD detecting the surrounding situation of the host vehicle M (Step S100). In the process of Step S100, for example, objects (for example, physical boundaries or other vehicles) near the host vehicle M may be recognized, or an obstacle out of the objects may be recognized.

Then, the second recognizer 134 recognizes a marking line (a map marking line ML) near the host vehicle M from the map information with reference to the map information on the basis of position information of the host vehicle M (Step S110). Then, the traveling controller 148 determines whether recognition states of the camera marking line CL and the map marking line ML satisfy predetermined conditions (Step S120).

When it is determined in the process of Step S120 that predetermined conditions are satisfied, the adjuster 144 moves the camera marking line CL and the map marking line ML such that the positions thereof with respect to the position of the host vehicle M match (Step S130). In the process of Step S130, a process of moving the position of the map marking line ML to match the position of the camera marking line CL is performed.

Then, the speed determiner 146 determines whether a moving speed at the time of movement is equal to or greater than a predetermined speed (Step S140). When it is determined that the moving speed is equal to or greater than the predetermined speed, it is determined whether an obstacle is present in the extending direction of the camera marking line CL (Step S150). The process of Step S150 may include determining whether an obstacle will be present in the extending direction of the camera marking line CL in the near future. In the process of Step S150, the map marking line ML may be used or a lane defined by any one marking line may be used instead of the camera marking line CL. When it is determined that an obstacle is present, the traveling controller 148 performs at least one of limitation of traveling control of the host vehicle M and notification associated with the limitation of traveling control (Step S160).

When it is determined in the process of Step S140 that the moving speed at the time of movement is not equal to or greater than the predetermined speed or it is determined in the process of Step S150 that an obstacle is not present in the extending direction of the camera marking line CL, the traveling controller 148 continues to perform the traveling control of the host vehicle M (Step S170). In the process of Step S170, a process of curbing notification may be performed according to necessity. When it is determined in the process of Step S120 that the recognition states of the camera marking line CL and the map marking line ML do not satisfy the predetermined conditions (for example, as in the first situation), the traveling controller 148 performs traveling control on the basis of the surrounding situation (Step S180). In this way, this routine of the flowchart ends.

According to the aforementioned embodiment, the automated driving control device 100 (an example of a mobile object control device) includes: the first recognizer 132 configured to recognize a camera marking line (an example of a first marking line) defining a moving lane in which a host vehicle M (an example of a mobile object) is moving and a surrounding situation including an obstacle near the host vehicle M on the basis of an output of the detection device detecting the surrounding situation of the host vehicle M; the second recognizer 134 configured to recognize a map marking line (an example of a second marking line) defining a moving lane near the host vehicle M from map information on the basis of position information of the host vehicle M; the moving controller configured to perform moving control of the host vehicle M on the basis of at least one of the camera marking line and the map marking line; the adjuster 144 configured to move and adjust a position of the camera marking line or the map marking line such that the positions of the camera marking line and the map marking line with respect to the position of the host vehicle M match when recognition states of the camera marking line and the map marking line defining the moving lane in which the host vehicle M is present satisfy predetermined conditions; and the speed determiner 146 configured to determine whether a moving speed when the camera marking line or the map marking line is moved by the adjuster 144 is equal to or greater than a predetermined speed. The moving controller performs at least one of limitation of the moving control and notification associated with the limitation when the speed determiner 146 determines that the moving speed is equal to or greater than the predetermined speed and an obstacle is present in an extending direction of the camera marking line. The moving controller continues to perform the moving control when it is determined that the moving speed is equal to or greater than the predetermined speed and an obstacle is not present in the extending direction of the camera marking line. Accordingly, it is possible to perform more appropriate moving control on the basis of the surrounding situation of the host vehicle M. In addition, it is possible to contribute to advancement of a sustainable transportation system.

Specifically, according to the embodiment, it is possible to curb excessive traveling control limitation or notification when a position of the map marking line is adjusted with respect to a position of the camera marking line on one side, and it is possible to reduce a risk by early performing limitation or notification when there is an obstacle. According to the embodiment, an appearance of the map marking line changes with the behavior of the host vehicle M, and the change of the appearance includes a change in angle due to turning of the host vehicle M in addition to lateral movement. Accordingly, it is possible to more accurately determine a situation using the rotational speed. According to the embodiment, when another vehicle (an example of another mobile object) is not present in the traveling direction of the host vehicle M but will be present in the future, it is possible to reduce a risk by performing limitation or notification of traveling control.

The above-mentioned embodiment can be expressed as follows:

A mobile object control device including:

a storage medium configured to store computer-readable instructions; and a processor connected to the storage medium, wherein the processor executes the computer-readable instructions to perform:

recognizing a first marking line defining a moving lane in which a mobile object is moving and a surrounding situation including an obstacle near the mobile object on the basis of an output of a detection device detecting the surrounding situation of the mobile object;

recognizing a second marking line defining a moving lane near the mobile object from map information on the basis of position information of the mobile object;

performing moving control of the mobile object on the basis of at least one of the first marking line and the second marking line;

moving and adjusting a position of the first marking line or the second marking line such that the positions of the first marking line and the second marking line with respect to a position of the mobile object match when recognition states of the first marking line and the second marking line defining the moving lane in which the mobile object is present satisfy predetermined conditions;

determining whether a moving speed when the first marking line or the second marking line is moved is equal to or greater than a predetermined speed;

performing at least one of limitation of the moving control and notification associated with the limitation when it is determined that the moving speed is equal to or greater than the predetermined speed and an obstacle is present in an extending direction of the first marking line; and continuing to perform the moving control when it is determined that the moving speed is equal to or greater than the predetermined speed and an obstacle is not present in the extending direction of the first marking line.

While an embodiment of the present invention has been described above, the present invention is not limited to the embodiment and can have various modifications and substitutions applied thereto without departing from the gist of the present invention.

What is claimed is:

1. A mobile object control device comprising:

a first recognizer configured to recognize a first marking line defining a moving lane in which a mobile object is moving and a surrounding situation including an obstacle near the mobile object on the basis of an output of a detection device detecting the surrounding situation of the mobile object;

a second recognizer configured to recognize a second marking line defining a moving lane near the mobile object from map information on the basis of position information of the mobile object;

a moving controller configured to perform moving control of the mobile object on the basis of at least one of the first marking line and the second marking line;

an adjuster configured to move and adjust a position of the first marking line or the second marking line such that the positions of the first marking line and the second marking line with respect to a position of the mobile object match when recognition states of the first marking line and the second marking line defining the moving lane in which the mobile object is present satisfy predetermined conditions; and a speed determiner configured to determine whether a moving speed when the first marking line or the second marking line is moved by the adjuster is equal to or greater than a predetermined speed, wherein the moving controller performs at least one of limitation of the moving control and notification associated with the limitation when the speed determiner determines that the moving speed is equal to or greater than the predetermined speed and an obstacle is present in an extending direction of the first marking line, and wherein the moving controller continues to perform the moving control when it is determined that the moving speed is equal to or greater than the predetermined speed and an obstacle is not present in the extending direction of the first marking line.

2. The mobile object control device according to claim 1, wherein, when the first marking line and the second marking line are recognized on one side of left and right marking lines defining the moving lane when seen from the mobile object and only the second marking line is recognized on the other side, the adjuster moves the position of the second marking line such that an angle formed by the extending directions of the first marking line and the second marking line on the one side is less than a predetermined angle.

3. The mobile object control device according to claim 2, wherein adjustment performed by the adjuster is to rotate the second marking line, and wherein the moving speed is a rotational speed based on the rotation of the second marking line.

4. The mobile object control device according to claim 3, wherein the moving speed is an estimated angular velocity of the position of the mobile object which is estimated on the basis of the rotation of the second marking line, and wherein the speed determiner determines that the moving speed is equal to or greater than the predetermined speed when a degree of separation between the estimated angular velocity and a measured angular velocity measured by a sensor measuring an angular velocity of the mobile object is equal to or greater than a threshold value.

5. The mobile object control device according to claim 2, wherein the obstacle includes another mobile object near the mobile object, and wherein the moving controller performs at least one of limitation of the moving control and notification associated with the limitation when a future position of the other mobile object is present in the extending direction of the first marking line on the one side.

6. The mobile object control device according to claim 1, wherein the moving controller continues to perform the moving control regardless of whether an obstacle is present when the moving speed is less than the predetermined speed.

7. A mobile object control method that is performed by a computer, the mobile object control method comprising:

recognizing a first marking line defining a moving lane in which a mobile object is moving and a surrounding situation including an obstacle near the mobile object on the basis of an output of a detection device detecting the surrounding situation of the mobile object;

recognizing a second marking line defining a moving lane near the mobile object from map information on the basis of position information of the mobile object;

performing moving control of the mobile object on the basis of at least one of the first marking line and the second marking line;

moving and adjusting a position of the first marking line or the second marking line such that the positions of the first marking line and the second marking line with respect to a position of the mobile object match when recognition states of the first marking line and the second marking line defining the moving lane in which the mobile object is present satisfy predetermined conditions;

determining whether a moving speed when the first marking line or the second marking line is moved is equal to or greater than a predetermined speed;

performing at least one of limitation of the moving control and notification associated with the limitation when it is determined that the moving speed is equal to or greater than the predetermined speed and an obstacle is present in an extending direction of the first marking line; and continuing to perform the moving control when it is determined that the moving speed is equal to or greater than the predetermined speed and an obstacle is not present in the extending direction of the first marking line.

8. A non-transitory computer-readable storage medium storing a program, the program causing a computer to perform:

recognizing a first marking line defining a moving lane in which a mobile object is moving and a surrounding situation including an obstacle near the mobile object on the basis of an output of a detection device detecting the surrounding situation of the mobile object;

recognizing a second marking line defining a moving lane near the mobile object from map information on the basis of position information of the mobile object;

performing moving control of the mobile object on the basis of at least one of the first marking line and the second marking line;

moving and adjusting a position of the first marking line or the second marking line such that the positions of the first marking line and the second marking line with respect to a position of the mobile object match when recognition states of the first marking line and the second marking line defining the moving lane in which the mobile object is present satisfy predetermined conditions;

determining whether a moving speed when the first marking line or the second marking line is moved is equal to or greater than a predetermined speed;

performing at least one of limitation of the moving control and notification associated with the limitation when it is determined that the moving speed is equal to or greater than the predetermined speed and an obstacle is present in an extending direction of the first marking line; and continuing to perform the moving control when it is determined that the moving speed is equal to or greater than the predetermined speed and an obstacle is not present in the extending direction of the first marking line.

* * * * *